No. 813,289. PATENTED FEB. 20, 1906.
N. W. HARTMAN.
GLASS BLOWING MACHINE.
APPLICATION FILED JUNE 6, 1904.

5 SHEETS—SHEET 1.

Witnesses.
G R Aylsworth
M L Marks.

Inventor.
Noble W Hartman
By Almon Hall, Atty.

No. 813,289. PATENTED FEB. 20, 1906.
N. W. HARTMAN.
GLASS BLOWING MACHINE.
APPLICATION FILED JUNE 6, 1904.

5 SHEETS—SHEET 3.

Witnesses:
Inventor:

No. 813,289. PATENTED FEB. 20, 1906.
N. W. HARTMAN.
GLASS BLOWING MACHINE.
APPLICATION FILED JUNE 6, 1904.

5 SHEETS—SHEET 4.

No. 813,289. PATENTED FEB. 20, 1906.
N. W. HARTMAN.
GLASS BLOWING MACHINE.
APPLICATION FILED JUNE 6, 1904.
5 SHEETS—SHEET 5.
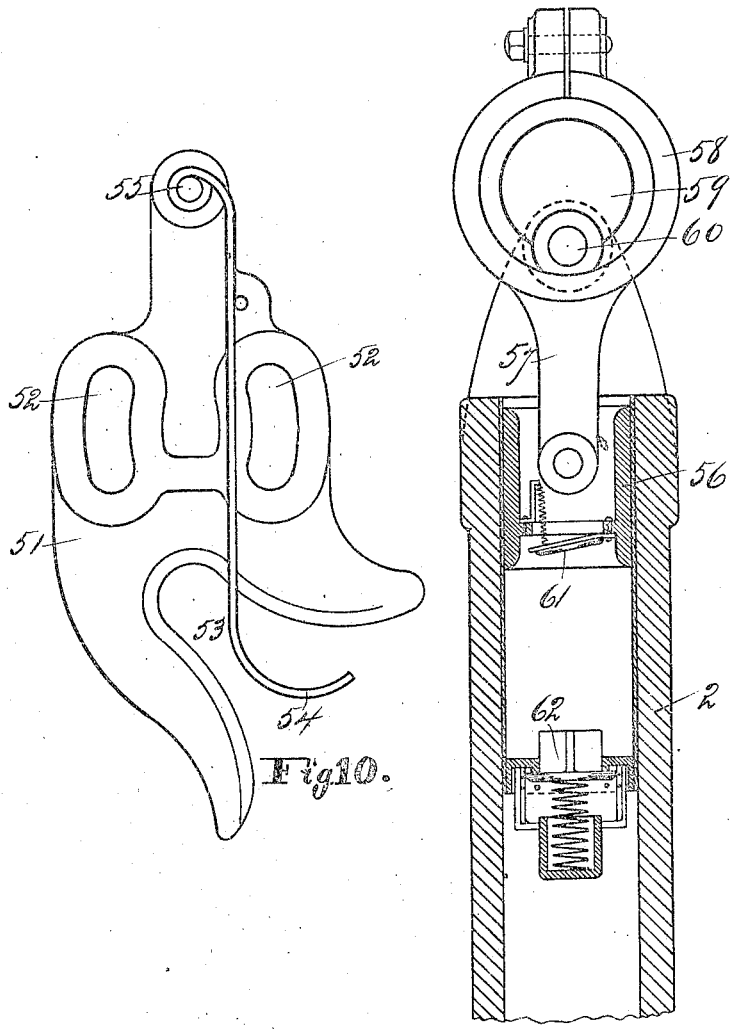

UNITED STATES PATENT OFFICE.

NOBLE W. HARTMAN, OF TOLEDO, OHIO, ASSIGNOR OF ONE-HALF TO GEORGE W. BURKHART, OF DETROIT, MICHIGAN.

GLASS-BLOWING MACHINE.

No. 813,289.

Specification of Letters Patent.

Patented Feb. 20, 1906.

Application filed June 6, 1904. Serial No. 211,313.

*To all whom it may concern:*

Be it known that I, NOBLE W. HARTMAN, a citizen of the United States, residing at Toledo, in the county of Lucas and State of Ohio, have invented certain new and useful Improvements in Glass-Blowing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines for blowing in molds hollow glass articles having either smooth or irregular exterior surfaces.

The objects of my invention are to provide a machine which may be used in connection with common blow-irons, such as are used by glass-blowers in mouth-blowing; to provide molds which are opened and closed automatically and which move away from the blown article as it is removed horizontally from the mold, thus obviating a large per cent. of the breakage due to removing blown articles from the molds by the usual methods; to provide a machine in which the cooling-bath for the heated molds is contained in an independent vessel separate from the machine, thereby doing away with undue weight of machine and facilitating the movement of the machine from place to place; to furnish means for moving the heated opened molds endwise through their bath instead of sidewise as heretofore, thereby permitting the water to come freely in contact with the heated surfaces of the mold; to provide an air-compressing mechanism which forms part of the machine and which is portable therewith, and to provide means for exactly regulating the air-pressure and for varying the same during each blowing operation.

My invention also relates to certain details of construction hereinafter described, and pointed out in the claims.

I attain the objects above enumerated by means of the devices and arrangement of parts hereinafter described and shown, and illustrated in the accompanying drawings, in which—

Figure 1:
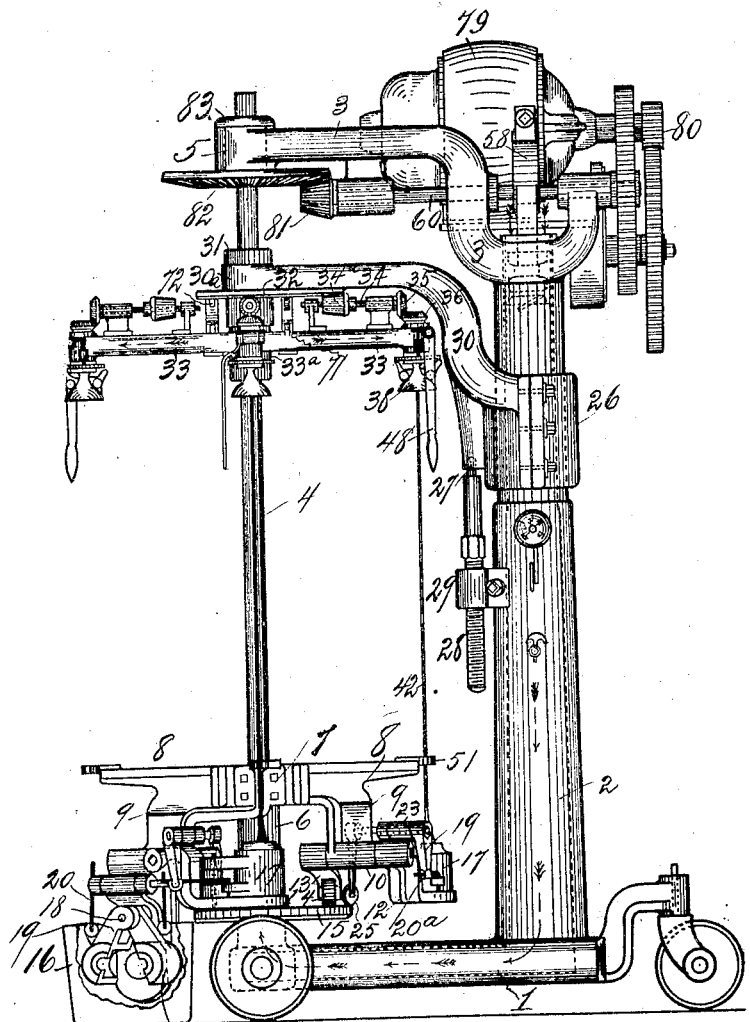
Figure 2:
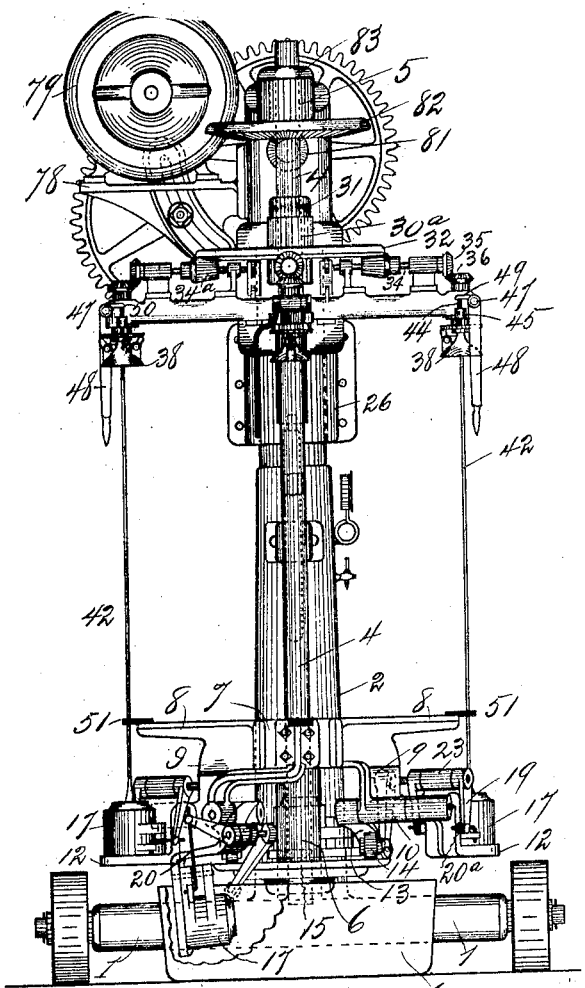
Figure 4:
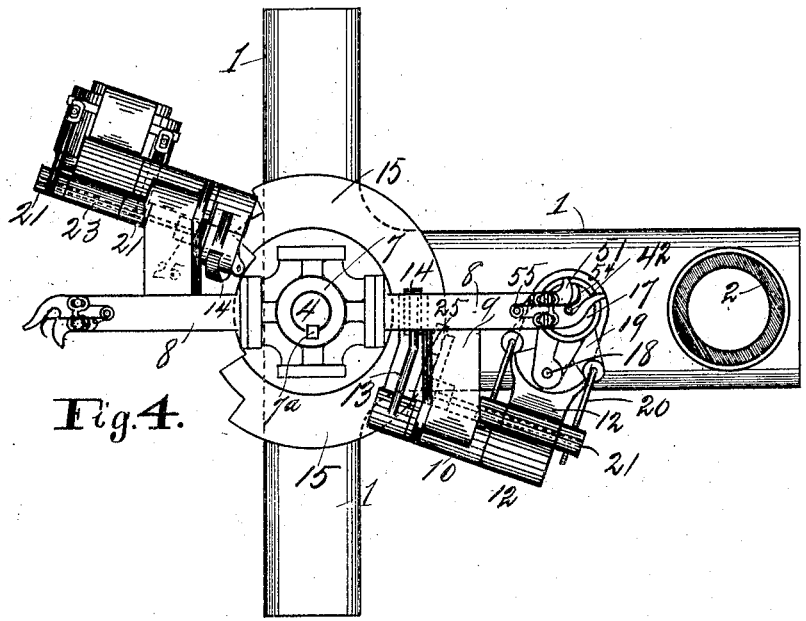
Figure 3:
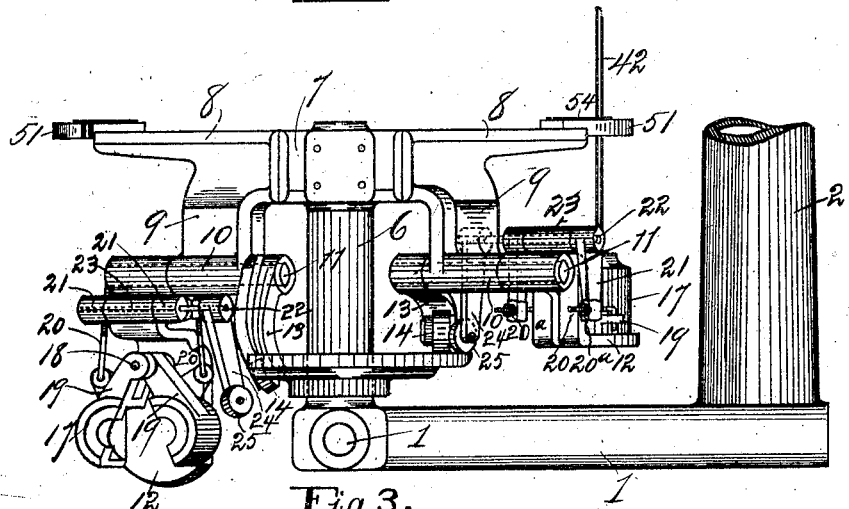
Figure 7:
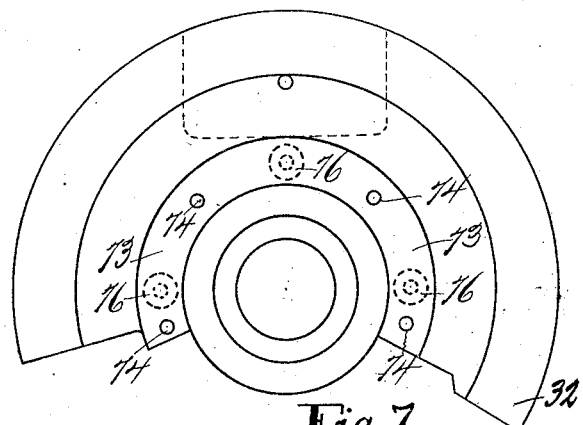
Figure 8:
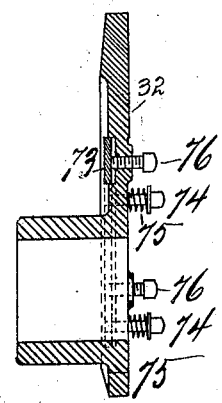
Figure 6:
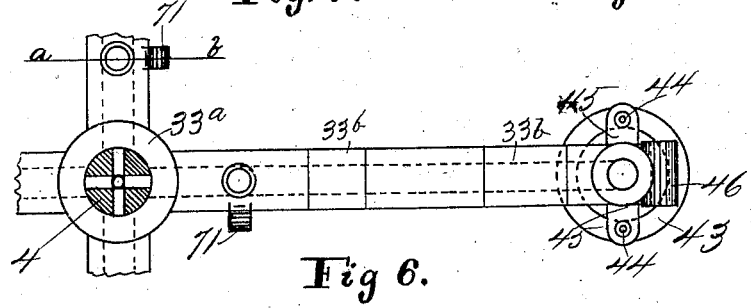
Figure 5:
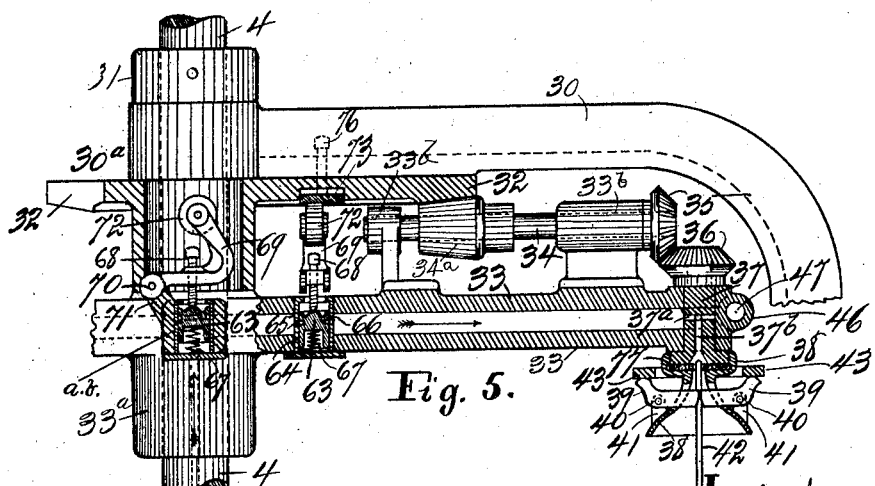

Figure 1 is a side elevation of my machine; Fig. 2, a front elevation with part of the bath broken away to show a mold in the cooling-bath; Fig. 3, a side elevation, on an enlarged scale, of the lower part of my machine, showing the revolving cross-arms hereinafter referred to and molds secured thereto in open and in closed positions, two of the cross-arms being removed for the sake of clearness; Fig. 4, a top plan view of the same; Fig. 5, a side elevation, partly in central vertical section, of the upper part of my machine, showing the blowing-head, air-valves, and means for holding and revolving the blow-iron; Fig. 6, a top plan view of one of the cross-arms of the blowing-head; Fig. 7, a bottom plan view of the segmental friction-disk hereinafter referred to for actuating the air-valves and for revolving the blow-irons; Fig. 8, a central transverse sectional elevation of the same; Fig. 9, a central vertical sectional elevation of the air-pump hereinafter referred to, together with its driving-cam; Fig. 10, a top plan view of the lower blow-iron support hereinafter referred to detached and on an enlarged scale.

Like numerals of reference indicate like parts throughout the drawings.

In the drawings, 1 is a base consisting of three stout arms, each of which has a wheel by means of which the machine may be wheeled from place to place. From the base springs a strong column and having at top an inwardly-extending arm 3. The base, column, and arm constitute the main housing or frame of my machine and are preferably made in one casting.

4 is the driving-shaft of my machine, journaled at its upper end in bearings 5 on the end of arm 3 and at its lower end in a deep socket or elongated sleeve 6, formed as part of the base.

7 is a hub revoluble with the shaft 4, but movable longitudinally thereon by means of spline and feather 7$^a$. The hub rests constantly upon the top of the sleeve or socket 6. Projecting horizontally and radially from the hub at equidistant intervals are arms 8—in this instance four in number, although the number may be varied as may be desired. Upon each arm 8 is a branch arm 9, which at a right angle to the arm 8 projects forwardly and downwardly in the direction of the rotation of the shaft. Each branch arm 9 terminates in a horizontal sleeve 10, in which is journaled a shaft 11. To the outer projecting end of this shaft is rigidly secured a mold-carrier 12, To the oppositely-projecting end of the shaft 11 is secured a downwardly-curved arm 13, upon the extremity of which is journaled a cam-roller 14, which rides upon a cam or mutilated disk 15, fixed rigidly to the sleeve 6. When the roller 14 in its travel leaves the end of its segmental path, it drops down, permitting the mold-carrier to fall into the position indicated at the left in Figs. 1 and 3.

16 is a vessel containing water placed so that the mold-carrier and its attached parts fall into and travel for a short distance through the water in the vessel. As the parts continue their horizontal rotation the curved arm 13 comes into contact with the other end of its segmental track and by the wedge-like action of the meeting surfaces the roller is lifted onto its track, restoring the mold-carrier to its horizontal position. Thus each mold-carrier with its burden is dipped each time the cut-away portion of its path is reached.

17 is a sectional mold, the two halves of which are hinged together upon a pintle 18, secured to the mold-carrier. Each of the mold-halves is provided with an arm 19, to the extremity of which is swiveled one end of a rod 20, the other end of which is screw-threaded and passes through a hole in the end of an arm 21. The threaded end of each of the rods 20 carries two nuts 20ª, disposed on opposite sides of arm 21. By means of these nuts the position of the mold upon the carrier, as well as the throw of the arms 21, may be adjusted. There is one of these arms for each mold-half. These pairs of arms 21 are fixed upon shaft 22, journaled in a sleeve 23, fixed to or formed as part of the mold-carrier. The inner end of the shaft 22 is extended and carries at its end an arm or crank 24, upon the end of which is journaled a roller 25, which rides upon the segmental disk or cam 15 next to its margin and in a path just outside the path of the roller 14. In the rotation of the arms 8 the rollers 25 leave the end of their track, and the weight of the rollers and their arms causes the shaft 22 to tilt, thus throwing the arms 21 and, through the swiveled rods 20, swinging the mold-halves apart upon their hinges. An instant after this operation the roller 14 runs off its track, which is a greater arc than the track of roller 25, (see Fig. 4,) and the mold-carrier, with its opened mold, drops and is bathed, as above described. When by the further movement of the machine the mold-carrier has been lifted to its elevated position, the arm 24 comes in contact with the end of its interrupted path and is swung so that when the roller 25 strikes its track the mold-halves are quickly and firmly brought together. It will be seen that the molds are opened in advance of the dropping of the mold-carrier and that the molds are closed after the lifting of the mold-carrier. It will also be seen that the open molds travel endwise through their bath, thus giving the water free access to the heated inner surfaces of the molds.

26 is a sleeve vertically movable and adjustable upon the column 2 and supported, as at 27, upon the head of a stout screw 28, screwed into a screw-eye or bracket 29, secured to the side of the column. Projecting from the sleeve or collar is an arm 30, the end of which is in alinement with and forms a bearing for the shaft 4. 31 is a collar rigidly secured to the shaft 4 and which rests upon the top of the arm 30, so that the shaft and its attachments are suspended from the end of arm 30. Upon the outer end of the arm 30 is formed a hub 30ª, to the under side of which and to the arm is secured rigidly a mutilated friction disk or wheel 32. (Shown in detail in Figs. 5, 7, and 8.) 33 33 are hollow cross-arms radiating from hub 33ª, which is rigidly secured to the shaft. These cross-arms are in vertical alinement with the mold-carrier arms 8. On the top of each of the arms 33 are two brackets 33ᵇ, in which is journaled a shaft 34, carrying a friction-roller 34ª, which is driven by contact with the under side of friction-wheel 32. At the outer end of each of the shafts 34 is a miter-gear 35 36, the latter being secured to the upper end of a short vertical shaft 37, journaled in the end of arm 33. To the bottom of each of the shafts 37 is secured a flaring bell-shaped guide 38. 39 39 are a pair of gripping-jaws pivoted, as at 40, upon lugs 41, formed on the outer side of the guide-piece 38 and extending in through slots from opposite sides of the guide-piece to near the center of the bell-shaped guide 38. The meeting ends of the bars or jaws 39 are concaved to conform to the sides of the upper end of blow-iron 42. At their outer ends the jaws 39 are extended beyond their pivots and are curved upwardly, as shown. The outer extremities of the pieces 39 are in contact with a ring 43. This ring rests loosely on top of the upturned ends of the pieces 39 and has rigidly secured to it two upwardly-projecting pins 44, passing through guide-lugs 45, formed on the arm 33. Formed on the extremity of each arm 33 is a transverse horizontal sleeve 46, in which is journaled a short shaft 47. At one end of this shaft is secured a lever 48, having a finger 49 extending at an angle to the lever and engaging the top of one of the pins 44. At the other end of the shaft 47 and secured thereto is another finger 50, which in like manner engages the top of the other pin 44. If the inlet end of a blow-iron be pushed up into the bell-shaped mouth of guide 38, it will pass between the adjacent ends of the bars 39, which swing on their pivots and yield to the upward movement of the blow-iron. The blow-iron is now held against downward movement by the end-to-end grip of the two bars or jaws 39. To release the blow-iron, the lever 48 is raised, pressing down the pins 44 and their attached ring 43, which in turn presses down upon the outer upturned ends of the gripping-pieces 39, thus lifting the inner ends of these pieces and releasing the blow-iron.

At the outer extremity of each of the arms 8 is a device for automatically catching and holding the lower end of the blow-iron in alinement with the axis of the mold. This device is illustrated, on an enlarged scale, in Fig. 10, in which 51 is a plate secured to the top of the end of arm 8 by means of two screw-bolts passing down through elongated curved holes 52 in the plate, which permit the plate to be adjusted longitudinally and laterally. The outer end of the plate is formed as a jaw 53, the mouth of which opens backwardly to its line of travel. 54 is a spring secured at one end, as at 55, by a bolt or rivet to the plate 51 and at its other end being curved backwardly and resting partly across the mouth of the jaw 53. When the upper end of the blow-iron is pushed up into the bell-mouthed guide 38, the lower end of the blow-iron is at the same time pushed sidewise against the spring 54, which yields, permitting the iron to slip into the crotch of the jaw, where it is held by the spring against lateral movement until the operator applies sufficient force to the iron to overcome the spring. It will be understood that the placing of the iron in operative position and the removal of the iron is always accomplished when the mold-halves are thrown into open position.

Base 1 and column 2 are hollow and form a reservoir for compressed air furnished by an air-pump, the plunger of which, 56, reciprocates in the upper end of the column 2 and is actuated by rod 57, connected with eccentric-strap 58 on eccentric 59 on counter-shaft 60, driven as hereinafter described. Plunger 56 is provided with a check-valve 61, opening inwardly, and in the barrel of the air-pump is fixed another check-valve 62, which also opens inwardly, both valves being held normally closed by springs, as shown.

The shaft 4 is hollow, and at its lower end the hollow is in communication with the compressed-air chamber in the base of the machine through the elongated hub 6, formed on top of the base of the machine. The arms 33 are hollow, and the hollow of each of these arms is in communication with the hollow of the shaft. In each of the arms 33 is a piston-valve 63, reciprocating in valve-case 64, let into the arm 33. In opposite sides of the valve-case are small holes 65. A circumferential channel or groove 66 is formed on the valve. This channel or groove may be moved into coincidence with the holes 65, so that there will be an uninterrupted air-passage through the valve and valve-case. A spring 67 holds the valve elevated, so that the air-passage is normally closed. Passing through the top of the valve-case 64 is an adjusting-screw 68, the lower end of which contacts with the top of valve 63. This adjusting-screw is supported in a threaded hole in a bent lever 69, fulcrumed, as at 70, upon a bracket 71, formed upon the arm 33. The opposite end of the lever carries a roller 72, which rides upon the under side of segmental ring 73, adjustably secured to the under side of friction-wheel 32.

In blowing glass in molds it is necessary that the pressure of the compressed air be regulated according to the character and size of the article to be blown and the degree of fluidity of the hot glass. It is also sometimes desirable that this pressure be varied during the blowing of each single article. I provide for this adjustment and variation of pressure as follows: The segmental ring 73 is supported by means of pins 74, secured at their lower ends to the ring and passing up through holes in the friction-disk 32. The pins 74 have heads between which and the top of the friction-disk are interposed coiled springs 75, which form an elastic support for the ring. Passing down and threaded through the friction-disk 32 are three adjusting-screws 76, spaced apart, as shown, their lower ends abutting against the top of the ring 73. By means of these screws the ring 73 or either end or the middle thereof may be raised or lowered, as may be desired. Since the swing of the levers 69 and the throw of the valves 63 depend upon the position of the segmental ring 73, on which the rollers 72 travel, it will be seen that the extent of the opening of the air-valve 63 and the consequent degree of air-pressure in the blow-irons are regulated and controlled through the vertical or angular adjustment of the segmental ring, accomplished by means of the adjusting-screws 76.

The shafts 37 have therethrough and in communication with the hollow of arms 33 two transverse cross-passages 37$^a$, which at their intersection are in communication with axial air-passages 37$^b$. Between the lower end of the shaft 37 and the top of the bell-mouthed guide 38 is clamped a gasket 77, having a central perforation for the reception of the upper end of the blow-iron. It will be seen that when the blow-iron is in place and when the valve 63 is open there is now an uninterrupted passage from the compressed-air chamber through the blow-iron to the flask.

Secured to the column 2, near its top, is a bracket 78, upon which is mounted an electric motor 79. Upon the shaft of the motor is a pinion 80, which engages a train of gears which drive the counter-shaft 60. This shaft, as above stated, carries the air-pump eccentric 59. It also carries a bevel-gear 81, which engages and drives a corresponding horizontal bevel-gear 82. The hub of this gear is journaled and supported, as at 83, in the sleeve 5 on the end of the arm 3. The shaft 4, by means of a spline and feather, is revoluble with but is longitudinally movable through the hub of its bevel gear-wheel 82.

The operation of my machine is as follows: The parts being assembled, as above described, the proper molds are secured to the mold-carrier and centered by means of adjusting-nuts 20ª. The blow-irons being of uniform length and the molds for different articles being of different heights, it becomes necessary to adjust vertically the parts which receive and hold the upper ends of the blow-irons. This is accomplished by means of the adjusting-screw 28, the rotation of which raises or lowers the arm 30, carrying with it bodily the shaft 4 and the cross-arms 33. At the same time the shaft 4 is revolved, carrying with it the cross-arms 7 and 33 and the parts secured thereto. As the friction-rollers 34ª successively come in contact with the stationary mutilated friction-disk 32 the shafts 37 and blow-iron holders 39 are revolved. The operator standing at the front of the machine—i. e., that side of the machine where the molds are opened and closed and dipped—places a blow-iron, upon which molten glass has been gathered in the usual manner, in the holders 39 53, as above described. At this time the mold is open and lowered into the cooling-tank and out of the way. As the iron proceeds away from the operator the open mold is lifted and closed around the glass on the lower end of the blow-iron, as hereinbefore described. Now the appropriate roller 72 comes in contact with the segmental ring 74, swinging lever 69 on its fulcrum, thus opening the valve 65 and admitting air through the blow-iron to the molten glass within the mold. The instant after the roller 72 strikes its track the friction-roller 34ª begins to travel upon its track, imparting axial motion through gears 35 36 to the blow-iron. The blowing continues until the roller 72 leaves its segmental track, when the air-valve, by the thrust of spring 67, automatically closes. An instant later the roller 34ª leaves its track and the blow-iron ceases to revolve as the mold opens. The operator now seizes the blow-iron with one hand and with the other hand for an instant raises lever 48, thus releasing the upper end of the blow-iron, as above described. The blow-iron may now be easily removed sidewise with its attached blown article as the mold moves away and drops into the bath. This method of removing the blown article is of great advantage, as it overcomes a large percentage of breakage encountered in the use of those machines in which the blown article is lifted vertically from the mold. As each mold passes the front of the machine the blow-iron with its blown article is removed and another blow-iron with gathered glass thereon is put in its place, so that with each rotation of the shaft 4 the operation here described is repeated four times and four completed articles are blown and removed from the machine.

Having described my invention, what I claim, and desire to secure by Letters Patent, is—

1. In a glass-blowing machine, a series of mold-holders, sectional molds mounted on said holders, means for revolving said series horizontally, a detached vessel which forms a bath for the molds, means for opening and closing the molds successively at fixed points in their rotation, and means for passing the opened molds endwise through said bath.

2. In a glass-blowing machine, a series of mold-holders, shafts upon one end of which the holders are rigidly mounted and which form pivotal supports for the mold-holders, crank-arms rigidly connected with the other end of said shafts, rollers on the crank-arms, a fixed segmental track for said rollers, means for revolving horizontally the series of mold-holders and their shafts and cranks, and a mold-cooling vessel which coincides with the cut-away portion of the segmental track.

3. In a glass-blowing machine, a horizontally-revoluble sectional mold composed of two pivotally-connected parts, a shaft, a pair of arms secured to said shaft, a pair of rods swiveled at one end to the mold parts and adjustably connected at the other end to said arms, a crank on the shaft, a roller on the crank, and a segmental track for the roller.

4. In a glass-blowing machine, a shaft having its bearings in a horizontally-revoluble sleeve, a mold-carrier secured to the shaft, a crank-arm secured to the shaft, a roller on the crank-arm, a mold comprising two pivotally-connected sections mounted upon the mold-carrier, another shaft, two arms secured to said other shaft and pivotally connected with said mold-sections, a crank-arm secured to said other shaft, a roller on said latter crank-arm, and a fixed mutilated disk upon which said two rollers travel in segmental paths, the path of the first-mentioned roller forming a greater arc than the path of the other roller.

5. In a glass-blowing machine, a base, an upright column thereon, an arm secured to the top of the column, a vertical shaft revoluble in bearings on the base and at the end of said arm, said shaft being vertically movable in said bearings, means for revolving the shaft, a sleeve slidable on the column, an arm projecting from the sleeve, means on said latter arm for the support of the shaft, means for the vertical adjustment of the sleeve, and a series of molds and a corresponding series of blowing mechanisms connected with and driven by the shaft.

6. In a glass-blowing machine, a series of horizontally-revoluble mold-carrying arms, molds thereon, a corresponding series of hollow blowing-arms carried above the molds, a hollow shaft concentric with and which drive said two series of arms in unison, the hollow of the upper arms being in communication with the hollow of the shaft, a normally closed air-valve in each of said upper arms, means for successively opening and closing said valves, means for supplying air through the hollow of the shaft, and means for conducting air from the extremities of the upper arms to the molds.

7. In a glass-blowing machine, a shaft, an arm secured to and revoluble with the shaft and having a longitudinal air-passage connected with a source of compressed air, a normally closed valve in the air-passage of the arm, a lever fulcrumed on the arm, connections between the lever and the valve, a roller on the lever, a track on which the roller travels, and means for the adjustment of the track.

8. In a glass-blowing machine, a vertical shaft, a horizontal arm secured to and revoluble with the shaft and having therethrough a longitudinal air-passage connected with an air-supply, a valve in the air-passage of the arm, and means for automatically controlling the flow of air through the valve, comprising a lever fulcrumed on the arm and connected with the valve, a roller on the lever, a flat segmental ring which forms a track for the roller, a stationary member, and adjusting-screws engaged with the stationary member and with the ring-segment.

9. In a glass-blowing machine, a main shaft, an arm secured to and revoluble with the shaft and having a longitudinal air-passage connected with a source of compressed air, a short shaft journaled in the end of the arm and having air-passages in communication with the air-passage in the arm, a blow-iron holder upon one end of the short shaft, a fixed mutilated friction-disk, a friction-wheel mounted on the arm and adapted to engage the friction-disk during a part of the revolution of the main shaft, driving connections between the friction-wheel and the short shaft, and means for revolving the main shaft.

10. In a glass-blowing machine, a base, a hollow upright column, an air-pump in the column, an arm on the column, a shaft journaled in the arm, a series of molds and a corresponding series of blowing mechanisms revoluble with the shaft, connections between the hollow of the column and said blowing mechanisms, and means for revolving the shaft and for actuating the air-pump.

11. A glass-blowing machine comprising a hollow base, a hollow column thereon having an arm at its top, a vertical hollow shaft journaled and longitudinally movable in said arm and in bearings on the base, the hollows of the base column and shaft being connected, a series of horizontal arms revolubly connected with the shaft by spline and feather, a series of molds supported by said arms, means for opening and closing and dipping the molds successively at each revolution of the shaft, a vertically-movable collar on the column, means for securing the collar in adjusted position, an arm on the collar, bearings on the latter arm which carry the shaft, a series of hollow arms, corresponding with the first-mentioned series of arms, secured to the shaft and having their hollows in communication with the hollow of the shaft, holders on the first-mentioned arms for the lower part of blow-irons, holders for such blow-irons at the extremities of the hollow arms, the latter holders being adapted to place the hollows of the arms and of such blow-irons in operative connection, an air-pump in the column, a motor on the column geared to drive the air-pump and the shaft, and means for admitting air from the hollow arms to the blow-irons and for revolving the blow-irons during a limited part of the rotation of the shaft.

In testimony whereof I affix my signature in presence of two witnesses.

NOBLE W. HARTMAN.

Witnesses:
CLEM V. WAGNER,
M. L. MARKS.